though 192,173
Patented June 29, 1965

3,192,173
ARTICLE OF POLYALKYLENE OXIDE, CELLULOSE AND TALC
Granville Thorpe Merrall, Altrincham, and Donald Caiger, Davyhulme, England, assignors to Shell Oil Company, New York, N.Y., a corporation of Delaware
No Drawing. Filed July 25, 1961, Ser. No. 126,519
Claims priority, application Great Britain, Aug. 8, 1960, 27,392/60
2 Claims. (Cl. 260—9)

The present invention is concerned with compositions comprising polymeric substances, which compositions are of particular value as starting material in the production of films and sheets, especially paper.

It is known that small amounts of fillers can be added to polymeric substances but it has been found that in general there is an upper limit to the amount of filler which can be incorporated without adversely affecting the mechanical properties of the polymeric substance by such an addition. Surprisingly it has now been found that tough, flexible films and sheets, especially paper, can be produced in accordance with the present invention from compositions comprising high molecular weight polymers of monomeric epoxy compounds such as alkylene oxides, styrene oxide, cyclohexene oxide and inert fillers and that unexpectedly large amounts of filler can be incorporated in such polymers of monomeric epoxy compounds to give compositions containing very large proportions of filler which are eminently suitable for making films and sheets and in particular paper. It is in fact surprising that a satisfactory paper can be made from a composition containing very high proportions of filler and it is believed that this is made possible by the nature of the high molecular weight polymers of monomeric epoxy compounds which in this respect appears to differ markedly from that of other polymeric substances.

The composition according to the present invention comprises a polymer of a monomeric vicinal monoepoxy compound, the polymer having a molecular weight of at least 10,000 preferably of at least 100,000 and from 20 to 95 percent by weight of the composition, of an inert filler.

Particularly preferred examples of polymers of monomeric epoxy compounds are alkylene oxide polymers, which may be homopolymers of alkylene oxides or copolymers of two or more different alkylene oxides. Examples of suitable alkylene oxides are ethylene oxide, 1,2 - propylene oxide, 2,3 - butylene oxide, iso-butylene oxide and isopropylethylene oxide. Other suitable olefin oxides are styrene oxide or cyclohexene oxide.

The polymers or copolymers may be produced by known catalytic methods of polymerizing the monomeric epoxy compounds or mixture of epoxy compounds.

Examples of suitable polymerization catalysts are alkyls, aryls, alkyl halides, aryl halides, alkoxides, aroxides, alkoxy halides, aroxy halides, alkyl or aryl alkoxides and alkyl or aryl aroxides of metals from Groups 2 to 5 of the Periodic Table. Mixtures of two or more Friedel-Crafts catalysts, for example boron fluoride, stannic chloride, ferric chloride and aluminum chloride, and mixtures of Friedel-Crafts catalysts with the Group 2 to 5 metal compounds hereinbefore described are also suitable as polymerization catalysts. Further examples of suitable catalysts for the polymerization of the alkylene oxides are alkaline earth metal carbonates and alkylates.

Especially preferred catalysts are a mixture of aluminium isopropoxide and zinc chloride, magnesium aluminium phenoxide, aluminium triethyl, diisobutylaluminium hydride, aluminium tri-isobutyl, zirconium tetrabutoxide, titanium dichlorodiethoxide, a partially reacted mixture of aluminium isopropoxide and ethylene glycol, aluminium diethoxychloride, zinc ethoxychloride, a mixture of aluminium tri-isopropoxide and zinc ethoxychloride, a mixture of zinc diethoxide and aluminium tri-isopropoxide, a mixture of zinc diethoxide and aluminium triethyl, a mixture of aluminium triethyl and zinc chloride, a mixture of aluminium ethyl diethoxide and ferric chloride and a mixture of aluminium trichloride and zinc chloride.

The process for the production of the polymer is generally carried out in the presence of a solvent, for example an aromatic or aliphatic hydrocarbon, a chlorinated hydrocarbon or an ether. The alkylene oxide for example is generally added to a solution of the catalyst and the resulting mixture is then kept at a temperature between about 0° C. and about 200° C. under a pressure generally between atmospheric pressure and 40 atmospheres for a reaction time which varies from a few hours to several days.

The choice of catalyst, amount of catalyst and the temperature at which the reaction is carried out are an effective means of controlling the molecular weight of the polymeric product. The polymeric product is generally dissolved in a solvent, for example benzene, after distilling off the excess alkylene oxide and then separating it from the solution by the addition of a non-solvent for example petroleum ether which is miscible with the solvent.

Representative methods for preparing the polymers are described in U.S. Patents Nos. 2,870,099 to Borrows et al.; 2,870,100 to Stewart et al.; 2,870,101 to Stewart, and in several pending patent applications filed by Newth et al.

Suitable polymers have viscometrically determined molecular weight of at least 10,000, preferably at least 100,000, and ranging up to 1,000,000 to 2,000,000.

The filler which is added to the polymer of the monomeric epoxy compound is preferably cellulose, silica or talc or a mixture of these substances. However, for certain applications carbon black, pigments such as metallic oxides, powdered metal and wood chips may be added to the polymeric material. The amount of filler added is preferably from 20 to 95 percent by weight of the composition; about 70 percent by weight is particularly preferred. The polymeric material and the inert filler are mixed together and generally with some solvent, for example water in the case of an ethylene oxide polymer, to give a paste which is spread on a surface and then dried.

In a particularly preferred application, a mixture of talc and cellulose is employed in which cellulose represents from 4 to 12 percent of total compositions. Cellulose improves the mechanical properties of the resulting sheet, providing the desired degree of flexibility.

Talc suitable for use in the invention is a conventional material of commerce. Cellulose is preferably in the fibrous form used in paper manufacture.

The main application of the composition according to the present invention is the production of a paper substitute and especially a water dispersible paper but it may also be used as a surface composition since it gives a smooth white surface when pigments are not used. Films and sheets of good mechanical properties may also be produced from the composition.

The present invention is further illustrated with reference to the following examples in which the percentages and part are by weight.

*Example 1*

Thirty parts of polyethylene oxide of molecular weight 300,000, which was produced by polymerizing ethylene oxide in the presence of a catalyst of aluminium isopropoxide and zinc chloride, is mixed with 65 parts of talc and 5 parts cellulose in 50 to 100 parts of water. The resulting slurry is then spread on a silicone-coated aluminium plate and dried at 55° C. A sheet of 0.40 mm. (0.016 inch) thickness and a tensile strength of 270 lbs. per square inch results.

*Example 2*

11% of the polyethylene oxide produced as described in Example 1 is made into a slurry with 83.5 parts talc and 5.5 parts cellulose in water and a sheet produced as outlined in the previous example. A sheet of thickness 0.86 mm. shows excellent physical properties; has a tensile strength of 130 p.s.i.

*Example 3*

10% of the polyethylene oxide produced as described in Example 1 is made into a sheet by drying a slurry of the polymer, 10% cellulose and 80% talc in water. The resulting sheet of thickness 0.55 mm. is of good quality and shows a tensile strength of 170 p.s.i.

*Example 4*

Examples 1–3 are repeated with similarly produced portions of polyethylene oxide having molecular weights of about 100,000 and about 1,000,000, respectively. Sheets of good quality are produced.

*Example 5*

Examples 1–3 are repeated with polypropylene oxide portions having molecular weights of 100,000, 300,000, and 1,000,000. Similarly useful sheets result.

*Example 6*

Fifty parts of the polyethylene oxide used in Example 1 is mixed with 50 parts of talc. A sheet is prepared as in Example 1, and is found to have a tough, parchment-like appearance.

*Example 7*

Example 6 is repeated but with a 20:80 ratio of polymer to talc. The resulting paper is relatively weak and brittle.

We claim as our invention:

1. As an article of manufacture, a sheet of a dry composition consisting essentially of from about 10 to about 30 percent by weight of polyethylene oxide of molecular weight of about 300,000, about 4 to 12 percent of cellulose and about 58 to 86 percent of talc.

2. As an article of manufacture, a sheet of a dry composition consisting essentially of from about 10 to about 30 percent by weight of a poly(alkylene oxide) of a molecular weight of at least 10,000 selected from the group consisting of polyethylene oxide and the polymer of 1,2 propylene oxide, about 4 to 12 percent cellulose and about 58 to 86 percent of talc.

References Cited by the Examiner

UNITED STATES PATENTS

| | | | |
|---|---|---|---|
| 2,914,491 | 11/59 | Bailey | 260—2 |
| 3,007,888 | 11/61 | Mack et al. | 260—37 |
| 3,036,023 | 5/62 | Rogers et al. | 260—37 |
| 3,125,544 | 3/64 | Winslow et al. | 260—9 |

WILLIAM H. SHORT, *Primary Examiner.*